United States Patent [19]

Carlqvist

[11] Patent Number: 4,520,628

[45] Date of Patent: Jun. 4, 1985

[54] METHOD FOR COMPRESSING AND HEATING A HEATING MEDIUM TO BE EXTERNALLY SUPPLIED TO AN ENGINE WHILE USING THE ENERGY AVAILABLE IN THE HOT EXHAUST GASES OF THE ENGINE

[75] Inventor: Stig G. Carlqvist, Malmö, Sweden

[73] Assignee: Stig G. Carlqvist Motor Consultant (CMC) AB, Malmö, Sweden

[21] Appl. No.: 633,069

[22] Filed: Jul. 23, 1984

Related U.S. Application Data

[63] Continuation of Ser. No. 421,719, Sep. 22, 1982, abandoned.

[30] Foreign Application Priority Data

Oct. 22, 1981 [SE] Sweden ................................. 8106246

[51] Int. Cl.$^3$ ........................ F01K 23/06; F02B 33/44
[52] U.S. Cl. ........................................ 60/616; 60/599; 60/605
[58] Field of Search ................... 60/616, 618, 599, 605

[56] References Cited

U.S. PATENT DOCUMENTS

| 2,633,698 | 4/1953 | Nettel | 123/27 X |
| 3,103,780 | 9/1963 | Tryhorn | 60/616 X |
| 4,033,135 | 7/1977 | Mandrin | 60/618 X |

*Primary Examiner*—Allen M. Ostrager
*Attorney, Agent, or Firm*—Barnes, Kisselle, Raisch, Choate, Whittemore & Hulbert

[57] ABSTRACT

In a method for compressing and heating a heating medium to be externally supplied to an engine, while using the energy available in the hot exhaust gases of the engine, the exhaust gases are caused to expand in at least two expansion stages to emit energy for compressing the heating medium in at least two compression stages, heat is transmitted from the exhaust gases after the first expansion stage to the heating medium after the last compression stage, and the heating medium is thereafter supplied with additional heat in a heat-producing unit before it is led to the engine.

9 Claims, 1 Drawing Figure

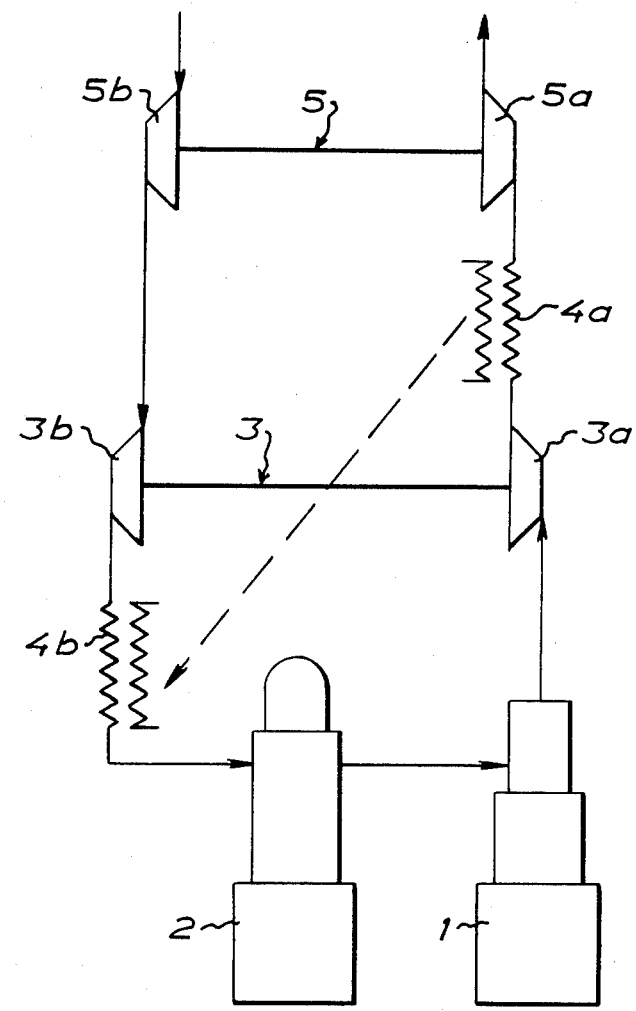

METHOD FOR COMPRESSING AND HEATING A HEATING MEDIUM TO BE EXTERNALLY SUPPLIED TO AN ENGINE WHILE USING THE ENERGY AVAILABLE IN THE HOT EXHAUST GASES OF THE ENGINE

This application is a continuation of application Ser. No. 421,719, filed 9/22/82, abandoned.

The present invention relates to a method for compressing and heating a heating medium to be externally supplied to an engine, while using the energy available in the hot exhaust gases of the engine.

A Stirling engine generally operates with a closed thermodynamic system in which a working medium, for instance helium, or hydrogen, receives heat from a heater. The heater is supplied with heat externally by means of a heating medium either directly, for instance in the form of combustion gas which is continuously burnt in a combustion chamber, or indirectly, for instance through a so-called heat pipe.

The heat transfer from the heating medium is considerably improved if the heating medium is supplied to the Stirling engine under high pressure. It is thus known in the art to pressurize a heating medium in the form of combustion gas by means of a system of compressor and expander units. Also, it is previously known to combine the heat production, i.e. the heating of the heating medium, with the production of shaft output in an additional engine so as to obtain a so-called compound engine.

Few, if any, prior-art methods of this type have hitherto been evaluated in actual practice, and most of them seen to imply considerable basic and practical drawbacks which make them difficult to realize. The gain, in terms of efficiency, obtained with these methods is evidently small.

The object of the present invention is to provide a method for compressing and heating a heating medium to be externally supplied to an engine, while using the energy available in the hot exhaust gases of the engine, this energy being used in an optimized and practically applicable way.

According to the invention, this object is achieved by the provision of a method for compressing and heating a heating medium to be externally supplied to an engine, while using the energy available in the hot exhaust gases of the engine, the method being characterized by causing the exhaust gases to expand in at least two expansion stages to emit energy for compressing the heating medium in at least two compression stages, transmitting heat from the exhaust gases after the first expansion stage to the heating medium after the last compression stage, and thereafter supplying additional heat to the heating medium in a heat-producing unit, before the heating medium is led to the engine.

Preferably, the exhaust gases are caused to expand in two expansion stages and the heating medium is compressed in two compression stages, heat being transferred from the exhaust gases between said two expansion stages.

Suitably, the exhaust gases in the first expansion stages are caused to drive an exhaust gas turbine for driving a compressor for compressing the heating medium in the last compression stage and, in the last expansion stage, to drive an exhaust gas turbine for driving a compressor for compressing the heating medium in the first compression stage.

The engine preferably is a Stirling engine.

A diesel engine or any other suitable engine, such as an Otto type, Brayton type or Rankine type engine, can be used as heat-producing unit.

The invention will be now described in greater detail with reference to the accompanying drawing, which schematically illustrates the method according to the invention.

In the drawing, there is shown a Stirling engine 1 which for heating its working medium is supplied with a heating medium which initially is air and which when supplied to the Stirling engine 1 is in the form of exhaust gases from a Diesel engine 2. The Stirling engine 1 and the Diesel engine 2 drive a common shaft (not shown) or each one shaft, these shafts (not shown) being interconnectible by means of a coupling (not shown) and/or a gear box (not shown), and form a so-called compound engine. The Diesel engine 2 is externally supplied with air. This air, as described in greater detail below, passes two compression stages and a subsequent heat transmission stage before reaching the Diesel engine 2 where it is converted into exhaust gases which are supplied to the Stirling engine 1. When the heating medium, i.e. the exhaust gases from the Diesel engine 2, has given off heat to the working medium in the Stirling engine 1, it is withdrawn from the Stirling engine in the form of exhaust gases. As described in greater detail below, these exhaust gases pass through two expansion stages and an intermediary transfer stage before being discharged.

The exhaust gases from the Stirling engine are caused to expand in a first expansion stage, in which they drive an exhaust gas turbine 3a in a compressor unit 3 which also comprises a compressor 3b for compressing, in a second compression stage, the air to be supplied to the diesel engine 2. In a heat exchanger 4a, 4b, the heat is transferred from the exhaust gases after expansion thereof in the first expansion stage, to the air after compression thereof in the second compression stage. The exhaust gases are then caused to expand in a second expansion stage, in which they drive an exhaust gas turbine 5a in a compressor 5 which also comprises a compressor 5b for compressing the air in the first compression stage.

In the example illustrated in the drawing, the compressor 5b takes in atmospheric air of a temperature of 0° C. In the compressor 5, the air pressure is increased by a factor 2.5 so as to obtain an air temperature of about 110° C. In the compressor 3b, the air pressure is increased by a factor 3.0 so as to obtain an air temperature of about 290° C. By the heat transfer from the exhaust gases of the Stirling engine 1, the temperature of the air is raised to about 550° C. The exhaust gases from the diesel engine 2 have a temperature of about 1100° C. while the exhaust gases from the Stirling engine 1 have a temperature of about 750° C. which is gradually lowered to about 600° C. in the first expansion stage, to about 350° C. in the heat transfer stage, and to about 200° C. in the second expansion stage.

By applying a high pressure to the heating medium as described above by compression in several stages (two in the illustrated example) and thereafter supplying it with residual heat from the exhaust gases of the Stirling engine 1, there is obtained a considerably improved heat transfer in the Stirling engine 1, and by causing the exhaust gases of the Stirling engine 1 to expand as described above in several stages (two in the illustrated example) with an intermediary heat transfer stage, the energy available in the exhaust gases is utilized in an optimized and practically applicable way. As will have been appreciated, the method described above can be entirely performed with components available on the market.

The Stirling engine 1 may be replaced by any other suitable engine with external supply of heating medium, and the diesel engine 2 may be replaced for instance by an Otto type, Brayton type or Rankine type engine or by any suitable heat-producing unit, for instance a unit which does not give any shaft output, i.e. which does not drive a shaft. In such a unit, use is made of the heat production alone.

What I claim and desire to secure by Letters Patent is:

1. A compound engine system comprising
   a heat-producing unit which receives air and exhausts a heated gaseous medium,
   an engine which receives the gaseous medium from the heat-producing unit for externally heating the engine,
   a first compression stage for compressing air for said heat-producing unit,
   a second compression stage for receiving and compressing the air from the first compression stage,
   a first expansion stage for receiving exhaust gases from the engine,
   a second expansion stage for receiving exhaust gases from said first expansion stage,
   said first compression stage and said second expansion stage being mechanically interconnected,
   said second compression stage and said first expansion stage being mechanically interconnected,
   a heat exchanger interposed between the first expansion stage and the second expansion stage and between the second compression stage and the heat producing unit such that heat is transferred between the exhaust gases passing from the first expansion stage to the second expansion stage and the air passing from the second compression stage to the heat producing unit.

2. The compound engine system set forth in claim 1 wherein said heat-producing unit is an engine selected from the group consisting of an Otto type, Brayton type or Rankine type, said engine and said Stirling engine being interconnected to form a compound engine.

3. The method of operating a heat-producing unit and an engine which comprises the steps of:
   compressing air in a first compressor stage,
   compressing air from the first compressor stage in a second compressor stage,
   directing said compressed air from the second compressor stage through a heat exchanger to the heat-producing unit,
   directing the exhaust gases of the heat-producing unit to the engine,
   directing the exhaust gases from the engine to a first expansion stage,
   causing the expansion stage to drive the second compressor stage,
   directing the exhaust gases from the first expansion stage through the heat exchanger to transfer heat to the compressed air being directed to the heat-producing unit,
   causing the second expansion stage to drive the first compressor stage.

4. The method set forth in claim 3 including the step of directing the air through another compression stage before directing it to the first compression stage and the step of directing the exhaust gases from the Stirling engine from the heat exchanger to a second expansion stage to drive the second compression stage.

5. A method for compressing and heating a working medium or heating medium to be externally supplied to a diesel-Stirling compound engine or engine with external heat supply (1), respectively, while using the energy available in the hot exhaust gases of the engine, characterized by causing the exhaust gases from the engine (1) to expand in at least two expansion stages to emit energy for compressing the heating medium in at least two compression stages, transferring heat from the exhaust gases after the first expansion stage to the heating medium after the last compression stage, and thereafter supplying additional heat to the heating medium in a heat-producing unit (2), before the heating medium is led to the engine (1).

6. The method as claimed in claim 5, characterized in that the exhaust gases from the engine (1) are caused to expand in two expansion stages and the the heating medium to the heat-producing unit (2) is compressed in two compression stages, and the heat is transferred from the exhaust gases between said two expansion stages.

7. The method as claimed in claim 5 or 6, characterized in that the exhaust gases in the first expansion stage are caused to drive an expander, such as an exhaust gas turbine (3a), for driving a compressor (3b) for compressing the heating medium in the last compression stage, and that the exhaust gases in the last expansion stage are caused to drive an expander, such as an exhaust gas turbine (5a), for driving a compressor (5b) for compressing the heating medium in the first compression stage.

8. The method as claimed in claims 5 or 6, characterized in that the engine is a Stirling engine (1).

9. The method as claimed in claims 5 or 6, characterized in that a diesel engine (2) is used as heat-producing unit.

* * * * *